United States Patent
Zhang et al.

(10) Patent No.: US 9,184,899 B2
(45) Date of Patent: Nov. 10, 2015

(54) DOWNLINK ASSOCIATION SET FOR UPLINK ACK/NACK IN TIME DIVISION DUPLEX SYSTEM

(75) Inventors: Xiaoxia Zhang, San Diego, CA (US); Wanshi Chen, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 12/903,593

(22) Filed: Oct. 13, 2010

(65) Prior Publication Data

US 2011/0255484 A1    Oct. 20, 2011

Related U.S. Application Data

(60) Provisional application No. 61/251,666, filed on Oct. 14, 2009.

(51) Int. Cl.
*H04W 4/00* (2009.01)
*H04L 5/00* (2006.01)
*H04L 1/16* (2006.01)

(52) U.S. Cl.
CPC .............. *H04L 5/0091* (2013.01); *H04L 5/001* (2013.01); *H04L 5/0055* (2013.01); *H04L 1/1607* (2013.01); *H04L 5/0053* (2013.01)

(58) Field of Classification Search
CPC .................................................... H04W 72/04
USPC .......... 370/322, 329, 341, 348, 443; 455/345, 455/263, 326, 336, 442, 498
See application file for complete search history.

(56) References Cited

U.S. PATENT DOCUMENTS

| | | | |
|---|---|---|---|
| 8,767,632 B2 * | 7/2014 | Ratasuk et al. | 370/329 |
| 2006/0120339 A1 * | 6/2006 | Akiyama et al. | 370/338 |

(Continued)

FOREIGN PATENT DOCUMENTS

| | | |
|---|---|---|
| CN | 1787468 A | 6/2006 |
| CN | 1864361 A | 11/2006 |

(Continued)

OTHER PUBLICATIONS

Alcatel-Lucent: "Blank Subframes for LTE", 3GPP Draft, R1-093340, 3rd Generation Partnership Project (3GPP), Mobile Competence Centre , 650, Route Des Lucioles , F-06921 Sophia-Antipolis Cedex , France, No. Shenzhen, China, 20090824, Aug. 24, 2009, XP050388121, [retrieved on Aug. 29, 2009].

(Continued)

*Primary Examiner* — Hassan Kizou
*Assistant Examiner* — Abdelnabi Musa
(74) *Attorney, Agent, or Firm* — Nerrie M. Zohn (57) ABSTRACT

In a Time Division Duplex (TDD) system, downlink and uplink communications share the same bandwidth but occupy different subframes. When the downlink has more subframes than the uplink, special treatment on user equipment (UE) ACK/NACK feedback is needed. One uplink may need to ACK multiple downlink subframes. A downlink association without unnecessary ACK/NACK resources sets accounts for subframes for which ACK feedback is not desired. Examples of such subframes include: a blank subframe; an almost blank subframe where only a cell specific Reference Signal (RS) is transmitted; a Time Division Multiplex (TDM) partition in which an evolved NodeB (eNB) only transmits a Physical Downlink Shared Channel (PDSCH) or a Physical Downlink Control Channel (PDCCH) indicating Semi-persistent scheduling (SPS) at certain downlink subframes; a Downlink Pilot Timeslot (DwPTS) with a certain special subframe configuration where an eNB does not send the PDSCH and the UE is not in SPS active mode in the DwPTS; and a Multi-Media Broadcast over a Single Frequency Network (MBSFN) subframe when the UE is not in SPS active mode in the MBSFN subframe.

20 Claims, 7 Drawing Sheets

(56) References Cited

U.S. PATENT DOCUMENTS

| | | | |
|---|---|---|---|
| 2006/0268883 A1* | 11/2006 | Qian et al. | 370/394 |
| 2009/0046649 A1* | 2/2009 | Gao et al. | 370/329 |
| 2010/0165939 A1* | 7/2010 | Lin | 370/329 |
| 2010/0172428 A1* | 7/2010 | Pani et al. | 375/262 |
| 2010/0210256 A1* | 8/2010 | Shen et al. | 455/422.1 |

FOREIGN PATENT DOCUMENTS

| | | | |
|---|---|---|---|
| CN | 101427488 A | | 5/2009 |
| CN | 101523966 A | | 9/2009 |
| WO | 2006113633 A2 | | 10/2006 |
| WO | WO-2008045471 A2 | | 4/2008 |
| WO | WO-2008127015 A1 | | 10/2008 |

OTHER PUBLICATIONS

Ericsson: "Efficient support of relays through MBSFN subframes", 3GPP Draft, R1-084357, 3rd Generation Partnership Project (3GPP), Mobile Competence Centre , 650, Route Des Lucioles , F-06921 Sophia-Antipolis Cedex , France, No. Prague, Czech Republic, 20081104, Nov. 4, 2008, XP050317627, [retrieved on Nov, 4, 2008].
International Search Report and Written Opinion—PCT/US2010/052736, International Search Authority—European Patent Office—Mar. 21, 2011.
Ericsson: "Efficient support of relays through MBSFN subframes" 3GPP Draft; R1-084357, 3rd Generation Partnership Project (3GPP), Mobile Competence Centre ; 650, Route Des Lucioles ; F-06921 Sophia-Antipolis Cedex ; France, No. Prague, Czech Republic; 20081104, Nov. 4, 2008, XP050317627 [retrieved on Nov. 4, 2008].
Taiwan Search Report—TW099135118—TIPO—Oct. 5, 2013.
Ericsson: "Details of ACK/NAK bundling for TDD" 3GPP Draft; R1-081566, 3rd Generation Partnership Project (3GPP), Mobile Competence Centre; 650, Route Des Lucioles; F-06921 Sophia-Antipolis Cedex; France, vol. RAN WG1, No. Shenzhen, China; 20080330, Mar. 30, 2008, XP050109981, 4 Pages.

* cited by examiner

DOWNLINK ASSOCIATION SET FOR UPLINK ACK/NACK IN TIME DIVISION DUPLEX SYSTEM

CROSS REFERENCE TO RELATED APPLICATION

This application claims the benefit of U.S. provisional patent application No. 61/251,666 filed Oct. 14, 2009, in the names of ZHANG et al., the disclosure of which is expressly incorporated herein by reference in its entirety.

BACKGROUND

1. Field

The present disclosure relates generally to communication, and more specifically to associating an unequal number of downlink and uplink subframes for acknowledgements in a wireless communication network.

2. Background

The 3rd Generation Partnership Project (3GPP) Long Term Evolution (LTE) represents a major advance in cellular technology and is the next step forward in cellular 3G services as a natural evolution of Global system for mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

LTE Advanced is an evolving mobile communication standard for providing 4G services. Being defined as 3G technology, LTE Rel-8 does not meet the requirements for 4G also called IMT Advanced as defined by the International Telecommunication Union such as peak data rates up to 1 Gbit/s. Besides the peak data rate, LTE Advanced also targets faster switching between power states and improved performance at the cell edge.

SUMMARY

The present application relates to a method, system, and means for improving the efficiency of acknowledgement/negative acknowledgment (ACK/NACK) feedback, specifically improving ACK/NACK bundling and ACK/NACK multiplexing. In ACK/NACK bundling, multiple downlink subframes may be combined in a single uplink subframe. In this manner, if all downlink subframes are successfully received, an ACK signal may be sent for the bundled downlink subframes. Conversely, if even a single downlink subframe cannot be acknowledged, a NACK signal may be sent for the bundled subframes. The present application improves on this mechanism by discounting certain types of subframes from affecting the determination of whether to ACK or NACK groups of subframes, and thereby improves the efficiency of the ACK/NACK feedback when performing ACK/NACK bundling and ACK/NACK multiplexing.

In one aspect of the present disclosure, a method is provided for defining a downlink and uplink subframe association in a wireless communication system. The method includes determining a feedback association associating a subframe acknowledgement in an uplink subframe with multiple downlink subframes. The method also includes modifying the feedback association to prevent at least one downlink subframe of the multiple downlink subframes from affecting the subframe acknowledgement.

In another aspect of the present disclosure an apparatus operable in a wireless communication system is provided. The apparatus includes means for determining a feedback association associating a subframe acknowledgement in an uplink subframe with multiple downlink subframes. The apparatus also has means for modifying the feedback association to prevent at least one downlink subframe of the multiple downlink subframes from affecting the subframe acknowledgement.

In yet another aspect of the present disclosure, a computer program product is provided for wireless communications. The computer program product has program code to determine a feedback association associating a subframe acknowledgement in an uplink subframe with multiple downlink subframes. The computer program product also has program code to modify the feedback association to prevent at least one downlink subframe of the multiple downlink subframes from affecting the subframe acknowledgement.

In a further aspect of the present disclosure, an apparatus operable in a wireless communication system is provided. The apparatus has processor(s) and a memory coupled to the processor(s). The processor(s) is configured to determine a feedback association associating a subframe acknowledgement in an uplink subframe with multiple downlink subframes. The processor(s) is also configured to modify the feedback association to prevent at least one downlink subframe of the multiple downlink subframes from affecting the subframe acknowledgement.

To the accomplishment of the foregoing and related ends, one or more aspects have the features fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

In a Time Division Duplex (TDD) system, downlink (DL) and uplink (UL) communications share the same bandwidth but occupy different subframes. In 3GPP Rel-8, seven (7) different uplink/downlink configurations are supported for allocating time periods to either uplink or downlink communications. When more subframes are allocated to the downlink than the uplink, special treatment on user equipment (UE) acknowledgement/negative-acknowledgement (ACK/NACK) feedback is needed. One uplink subframe may need to ACK multiple downlink subframes.

Two ACK/NACK feedback modes are supported in Rel-8, specifically ACK/NACK bundling and ACK/NACK multiplexing. In ACK/NACK bundling, multiple downlink subframes will be combined on a per codeword basis and acknowledged in a single uplink subframe. In this manner, if all downlink subframes are successfully received, an ACK signal will be sent for the bundled downlink subframes. However if even a single downlink subframe cannot be acknowledged, a NACK signal will be sent for the bundled subframes. In ACK/NACK multiplexing, spatial bundling is performed within each downlink subframe such that each downlink subframe only requires one ACK/NACK bit. Multiple ACK/NACK bits (up to 4 bits in Release 8) can then be transmitted in a single uplink subframe acknowledging multiple downlink subframes.

In 3GPP Release 8 TS 36.213, a downlink association set index K: $\{k0, k1, \ldots kM-1\}$ (M is defined as the number of elements in set K) for TDD is specified and is shown below in TABLE 1:

TABLE 1

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The table above shows examples of downlink subframe bundling windows. The table shows uplink subframes handling ACK/NACK feedback for certain downlink subframe(s). For example, in uplink-downlink configuration 4, uplink subframe 2 handles ACK/NACK feedback for downlink subframes which are {12, 8, 7, 11} subframes earlier than uplink subframe 2, i.e. downlink subframes {0, 4, 5, 1}. Uplink subframe 3 handles ACK/NACK feedback for downlink subframes which are {6, 5, 4, 7} subframes earlier than uplink subframe 3, i.e., downlink subframes {7, 8, 9, 6}. Depending on the uplink-downlink configuration one uplink subframe may be responsible for ACK/NACK feedback for one or multiple downlink subframes. In certain situations, even distribution between uplink subframe responsibility is desired to reduce situations where one uplink subframe is responsible for ACK/NACK feedback for a large number of downlink subframes.

Currently the association set is constructed based on the assumption that all downlink subframes may transmit to the UE either a Physical Downlink Shared Channel (PDSCH) or a Physical Downlink Control Channel (PDCCH) having a Semi-Persistent Scheduling (SPS) release command.

Issues arise from this assumption. In some scenarios, some downlink subframes do not require ACK/NACK feedback. For example, downlink subframes not containing either a PDSCH or a PDCCH indicating SPS release do not require ACK/NACK feedback. In those scenarios the UE need not perform ACK/NACK feedback for these downlink subframes. Examples of such scenarios include:

(a) A blank subframe;

(b) An almost blank subframe where limited downlink signals are transmitted, e.g., only a cell specific Reference Signal (RS) is transmitted;

(c) A Time Division Multiplex (TDM) partition in which an evolved NodeB (eNB) only transmits a Physical Downlink Shared Channel (PDSCH) or a Physical Downlink Control Channel (PDCCH) indicating SPS release at certain downlink subframes;

(d) A Downlink Pilot Timeslot (DwPTS) having a subframe configuration in which the eNB does not send the PDSCH and the UE is not in an SPS active mode in the DwPTS subframe; and (e) A Multi-Media Broadcast over a Single Frequency Network (MBSFN) subframe and the UE not being in an SPS active mode in the MBSFN subframe.

With the downlink association set in the current specification, unnecessary uplink ACK/NACK resources are allocated and unnecessary ACK/NACK spatial bundling is introduced for scenarios such as those above, which do not require ACK/NACK feedback. This results in unnecessary overhead which may result in performance loss.

An example embodiment may address these issues by discounting downlink subframes which do not require ACK/NACK feedback from the ACK/NACK feedback process (e.g., those subframes discussed above in items (a) through (e)). In this manner the UE may reduce the number of downlink subframes having ACK/NACK feedback handled by the uplink subframes, by removing certain downlink subframes from processing, e.g., removing downlink subframes from a bundling window table such as shown in Table 1.

To address issues for multi-carrier configurations for LTE-A, on each carrier, those subframes that do not require ACK/NACK feedback may be discounted in the feedback association set. Additionally or separately, on a per subframe basis, the carriers that do not require ACK/NACK feedback may be discounted in the association set.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
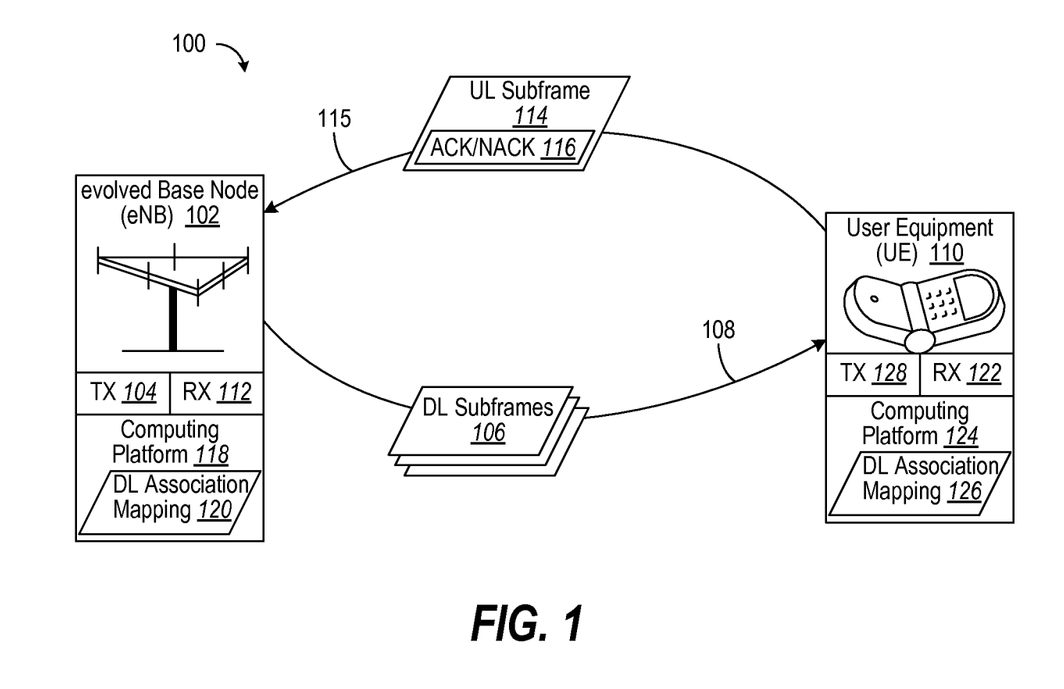
FIG. 1 illustrates a block diagram of a communication system in which a downlink association mapping discounts subframes for appropriate association of an uplink acknowledgement/negative acknowledgment (ACK/NACK) when downlink subframes and uplink subframes are of differing numbers.

In FIG. 1, in a wireless communication system 100, an apparatus such as an evolved Base Node (eNB) (also referred to as an evolved NodeB) 102 addresses a need for providing an uplink acknowledgement in an uplink subframe for two or more downlink subframes in a third generation (3G) or fourth generation (4G) deployment such as LTE or LTE-A. To that end, the eNB 102 has a transmitter 104 for transmitting a first number of downlink subframes 106 on a downlink 108 to another apparatus such as a user equipment (UE) 110. An eNB receiver 112 receives an uplink subframe 114 from the UE 110 on an uplink 115. The receiver 112 may also receive an acknowledgment signal or negative-acknowledgement signal (ACK/NACK) 116 from the UE 110 on the uplink subframe 114. A computing platform 118 accesses a downlink association mapping 120 that discounts one or more downlink subframes 106 that do not require ACK/NACK feedback. The computing platform 118 associates the ACK/NACK 116 with one or more of the downlink subframes 106 based upon the downlink association mapping 120.

Similarly, the UE 110 associates uplink acknowledgement in a uplink subframe for two or more downlink subframes in the wireless communication system 100. A UE receiver 122 receives the first number of downlink subframes 106 from the eNB 102. A computing platform 124 accesses a downlink association mapping 126 that discounts one or more downlink subframes not requiring ACK/NACK feedback. The computing platform 124 assigns the ACK/NACK 116 arising from one or more of the downlink subframes 106 to the uplink subframe 114 based upon the downlink association mapping 126. A UE transmitter 128 transmits the uplink subframe 114 including the ACK/NACK 116 on the uplink subframe 114.

Figure 2:
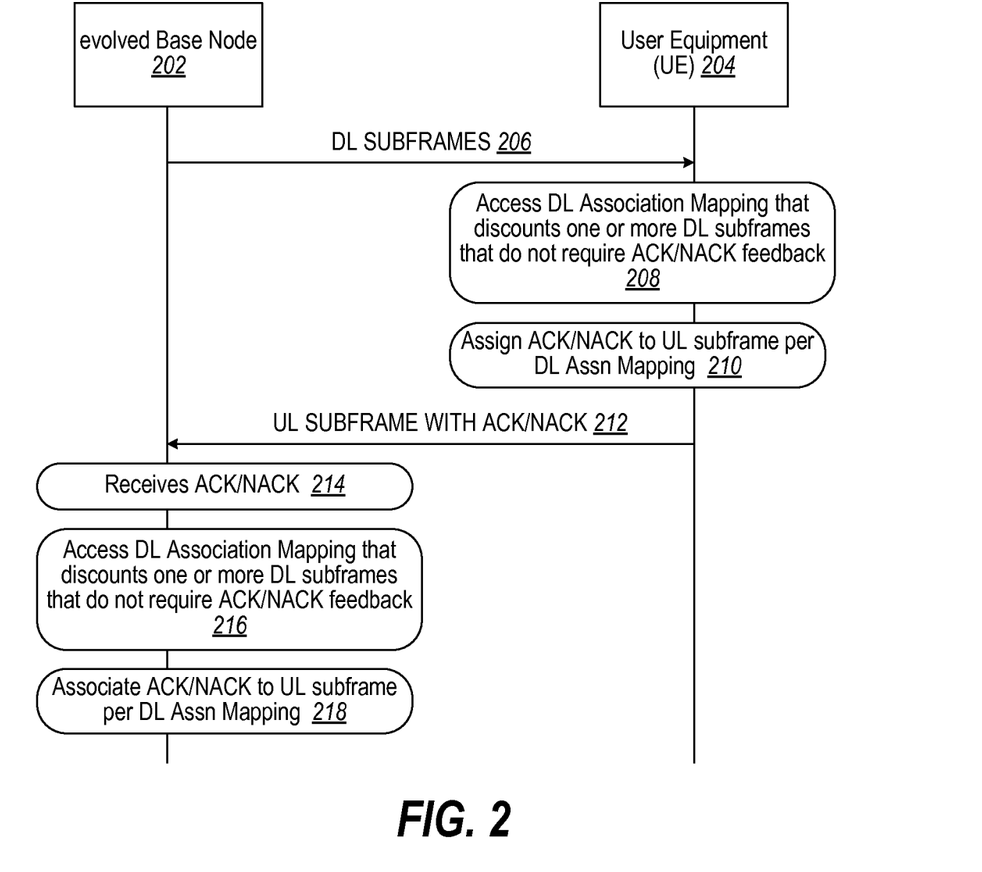
FIG. 2 illustrates a timing diagram for an evolved NodeB and user equipment to utilize the downlink association mapping of FIG. 1.

FIG. 2 illustrates a methodology or sequence of operations performed by an eNB 202 and a UE 204. As depicted at time 206, the eNB 202 transmits a first number of downlink subframes that are received by the UE 204. The UE 204 accesses a downlink association mapping that discounts one or more downlink subframes that do not require ACK/NACK feedback (block 208).

In an exemplary aspect, the downlink subframes that are discounted include (a) a blank subframe; (b) an almost blank subframe transmitting only a cell specific RS; (c) a subframe in a TDM partition configuration in which the PDSCH or PDCCH are transmitted indicating SPS at certain downlink subframes; (d) a DwPTS with a subframe configuration in which the PDSCH is not transmitted and the user equipment is not in an SPS active mode in the DwPTS subframe; and (e) a MBSFN subframe and the UE is not in an SPS active mode in the MBSFN subframe.

The UE 204 assigns an ACK/NACK arising from a number of downlink subframes to an uplink subframe based upon the downlink association mapping (block 210). The UE 204 transmits and the eNB 202 receives the uplink subframe including the ACK/NACK, at time 212.

The eNB 202 receives the ACK/NACK from the UE 204 on the uplink subframe (block 214). The eNB 202 accesses the downlink association mapping that discounts one or more downlink subframes that do not require ACK/NACK feedback (block 216). The eNB 202 associates the ACK/NACK with the number of downlink subframes based upon the downlink association mapping (block 218).

Figure 2A:
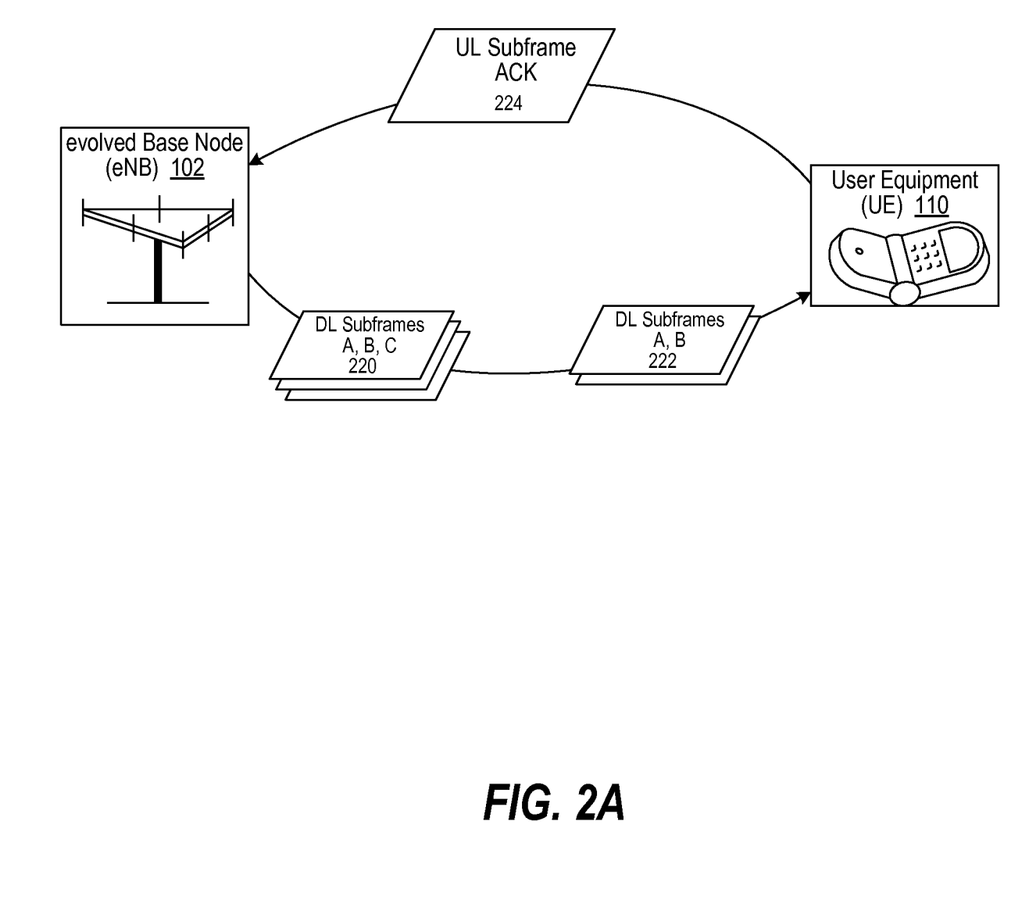
FIG. 2A illustrates a block diagram of a communication system according to one aspect.

FIG. 2A illustrates a block diagram of a communication system according to one aspect. In the illustration of FIG. 2A, an eNB transmits DL subframes A, B, and C (block 220) to UE 110 however only subframes A and B (block 222) are properly received. Under present Release 8 operation this configuration would call for the UE to transmit a NACK message on the UL subframe designated for acknowledgement of the corresponding DL subframes. However in an aspect of the present disclosure, if subframe C is a subframe type to be discounted, such as a blank subframe, then a failure to properly receive subframe C would not affect the acknowledgement of the remaining subframes. In this aspect, the UE would send an ACK for the received DL subframes on the designated UL subframe, as shown in block 224 of FIG. 2A.

In one aspect, at least one of the number of downlink subframes and the uplink subframe are associated with multiple carriers.

In some aspects the teachings may be employed in a network that includes macro scale coverage (e.g., a large area cellular network such as a 3G (Third Generation) networks, referred to as a macro cell network) and smaller scale coverage (e.g., a residence-based or building-based network environment). As an access terminal ("AT") (also referred to as UE) moves through such a network, the access terminal may be served in certain locations by access nodes ("ANs") (also referred to as macro eNB) that provide macro coverage while the access terminal may be served at other locations by access nodes that provide smaller scale coverage (e.g., pico or femto eNBs). In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 3:
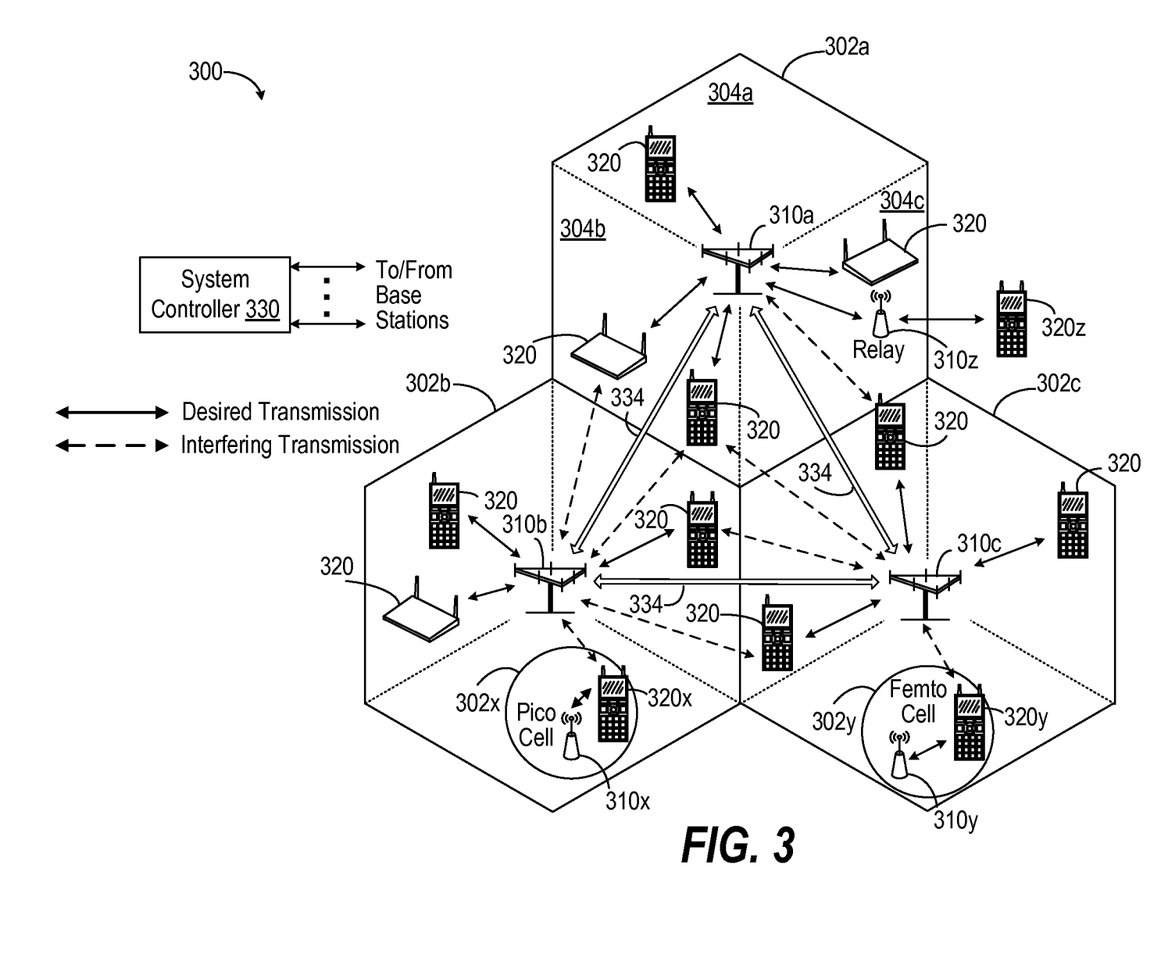
FIG. 3 illustrates a diagram of a wireless communication system comprising macro cells, femto cells and pico cells.

In the example shown in FIG. 3, base stations 310a, 310b and 310c may be macro base stations for macro cells 302a, 302b and 302c, respectively. Base station 310x may be a pico base station for a pico cell 302x communicating with a terminal 320x. Base station 310y may be a femto base station for a femto cell 302y communicating with a terminal 320y. Although not shown in FIG. 3 for simplicity, the macro cells may overlap at the edges. The pico and femto cells may be located within the macro cells (as shown in FIG. 3) or may overlap with macro cells and/or other cells.

The wireless network 300 may also include relay stations, e.g., a relay station 310z that communicates with the terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals.

A network controller 330 may couple to a set of base stations and provide coordination and control for these base stations. The network controller 330 may be a single network entity or a collection of network entities. The network controller 330 may communicate with base stations 310 via a backhaul. Backhaul network communication 334 can facilitate point-to-point communication between base stations 310a-310c employing such a distributed architecture. Base stations 310a-310c may also communicate with one another, e.g., directly or indirectly via wireless or wireline backhaul.

The wireless network 300 may be a homogeneous network that includes only macro base stations (not shown in FIG. 3). The wireless network 300 may also be a heterogeneous network that includes base stations of different types, e.g., macro base stations, pico base stations, home base stations, relay stations, etc. These different types of base stations may have different transmit power levels, different coverage areas, and different impact on interference in the wireless network 300. For example, macro base stations may have a high transmit power level (e.g., 20 Watts) whereas pico and femto base stations may have a low transmit power level (e.g., 9 Watts). The techniques described may be used for homogeneous and heterogeneous networks.

Terminals 320 may be dispersed throughout the wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

The wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at the base station 310, where each group of antennas is responsible for communication with terminals 320 in a portion of the cell 302a, 302b, or 302c. For example, a base station 310 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
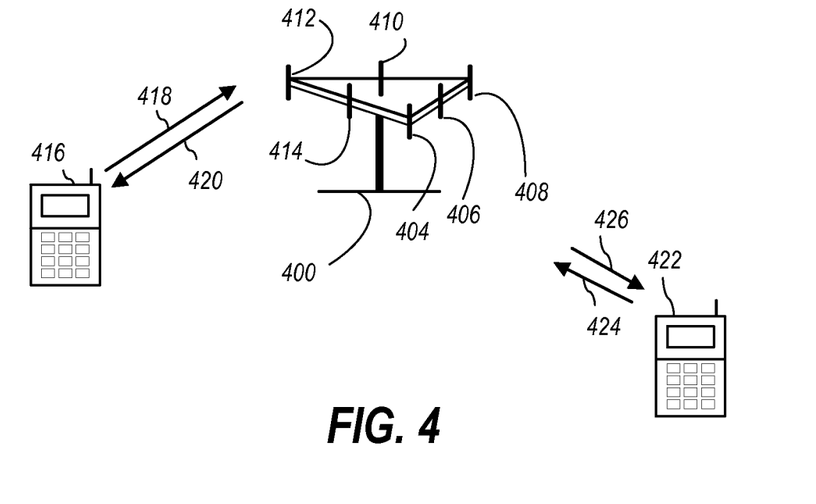
FIG. 4 illustrates a diagram of a multiple access wireless communication system.

Referring to FIG. 4, a multiple access wireless communication system according to one aspect is illustrated. An access point (AP) 400 includes multiple antenna groups, one including antennas 404 and 406, another including antennas 408 and 410, and an additional group including antennas 412 and 414. In FIG. 4, only two antennas are shown for each antenna group, however, more or fewer antennas may be utilized for each antenna group. The user equipment (UE) 416 is in communication with antennas 412 and 414, where antennas 412 and 414 transmit information to the UE 416 over forward link 420 and receive information from the UE 416 over reverse link 418. The UE 422 is in communication with antennas 406 and 408, where antennas 406 and 408 transmit information to the UE 422 over forward link 426 and receive information from the UE 422 over reverse link 424. In a frequency division duplexed (FDD) system, communication links 418, 420, 424 and 426 may use different frequencies for communication. For example, the forward link 420 may use a different frequency than the reverse link 418.

Each group of antennas and/or the area in which they are designed to communicate is often referred to as a sector of the access point. In the aspect, antenna groups each are designed to communicate to user equipment in a sector of the areas covered by access point 400.

In communication over forward links 420 and 426, the transmitting antennas of the access point 400 utilize beamforming in order to improve the signal-to-noise ratio of forward links for the different UEs 416 and 422. Also, an access point using beamforming to transmit to UEs scattered randomly through its coverage causes less interference to UEs in neighboring cells than an access point transmitting through a single antenna to all of its UEs.

An access point may be a fixed station used for communicating with the terminals and may also be referred to as a base station, a Node B, or some other terminology. A user equipment (UE) may also be referred to as an Access Terminal (AT), a wireless communication device, terminal, or some other terminology.

Figure 5:
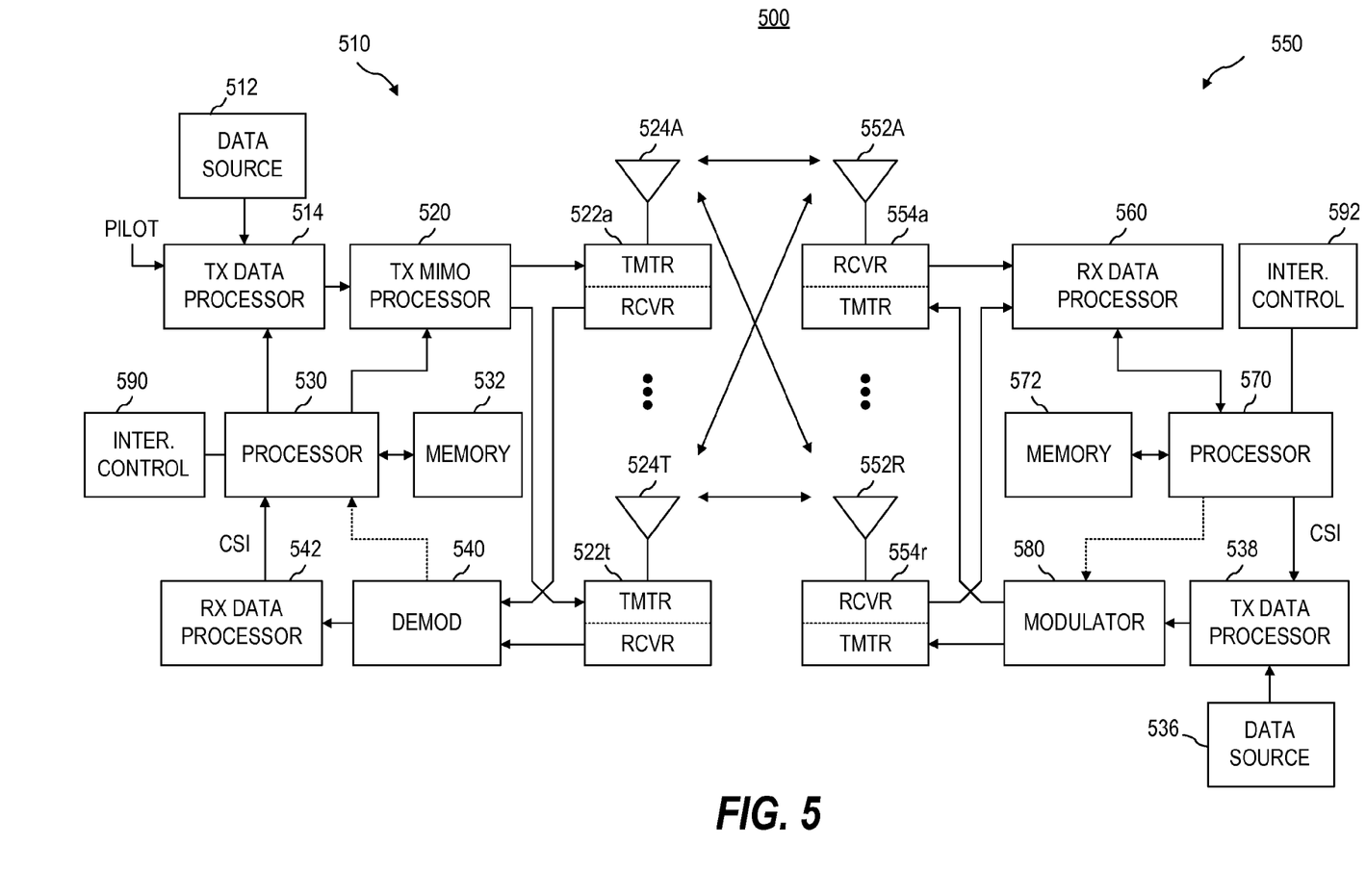
FIG. 5 illustrates a schematic of a multiple input multiple output (MIMO) communication system.

The teachings may be incorporated into a node (e.g., a device) employing various components for communicating with at least one other node. FIG. 5 depicts several sample components that may be employed to facilitate communication between nodes. Specifically, FIG. 5 illustrates a wireless device 510 (e.g., an eNB) and a wireless device 550 (e.g., a UE) of a MIMO system 500. At the device 510, traffic data for a number of data streams is provided from a data source 512 to a transmit ("TX") data processor 514.

In some aspects, each data stream is transmitted over a respective transmit antenna. The TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A data memory 532 may store program code, data, and other information used by the processor 530 or other components of the device 510.

The modulation symbols for all data streams are then provided to a TX MIMO processor 520, which may further process the modulation symbols (e.g., for OFDM). The TX MIMO processor 520 then provides NT modulation symbol streams to NT transceivers ("XCVR") 522a through 522t that each has a transmitter (TMTR) and receiver (RCVR). In some aspects, the TX MIMO processor 520 applies beam-forming weights to the symbols of the data streams and to the antenna from which the symbol is being transmitted.

Each transceiver 522a-522t receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 522a through 522t are then transmitted from NT antennas 524a through 524t, respectively.

At the device 550, the transmitted modulated signals are received by NR antennas 552a through 552r and the received signal from each antenna 552a-552r is provided to a respective transceiver ("XCVR") 554a through 554r. Each transceiver 554a-554r conditions (e.g., filters, amplifies, and downconverts) a respective received signal, digitizes the conditioned signal to provide samples, and further processes the samples to provide a corresponding "received" symbol stream.

A receive ("RX") data processor 560 then receives and processes the NR received symbol streams from NR transceivers 554a-554r based on a particular receiver processing technique to provide NT "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the device 510.

A processor 570 periodically determines which pre-coding matrix to use. The processor 570 formulates a reverse link message comprising a matrix index portion and a rank value portion. A data memory 572 may store program code, data, and other information used by the processor 570 or other components of the device 550.

The reverse link message may include various types of information regarding the communication link and/or the received data stream. The reverse link message is processed by a TX data processor 538, which also receives traffic data for a number of data streams from a data source 536, modulated by a modulator 580, conditioned by the transceivers 554a through 554r, and transmitted back to the device 510.

At the device 510, the modulated signals from the device 550 are received by the antennas 524a-524t, conditioned by the transceivers 522a-522t, demodulated by a demodulator ("DEMOD") 540, and processed by a RX data processor 542 to extract the reverse link message transmitted by the device 550. The processor 530 then determines which pre-coding matrix to use for determining the beam-forming weights then processes the extracted message.

FIG. 5 also illustrates that the communication components may include one or more components that perform interference control operations. For example, an interference ("INTER.") control component 590 may cooperate with the processor 530 and/or other components of the device 510 to send/receive signals to/from another device (e.g., device 550). Similarly, an interference control component 592 may cooperate with the processor 570 and/or other components of the device 550 to send/receive signals to/from another device (e.g., device 510). It should be appreciated that for each device 510 and 550 the functionality of two or more of the described components may be provided by a single component. For example, a single processing component may provide the functionality of the interference control component 590 and the processor 530 and a single processing component may provide the functionality of the interference control component 592 and the processor 570.

Figure 6:
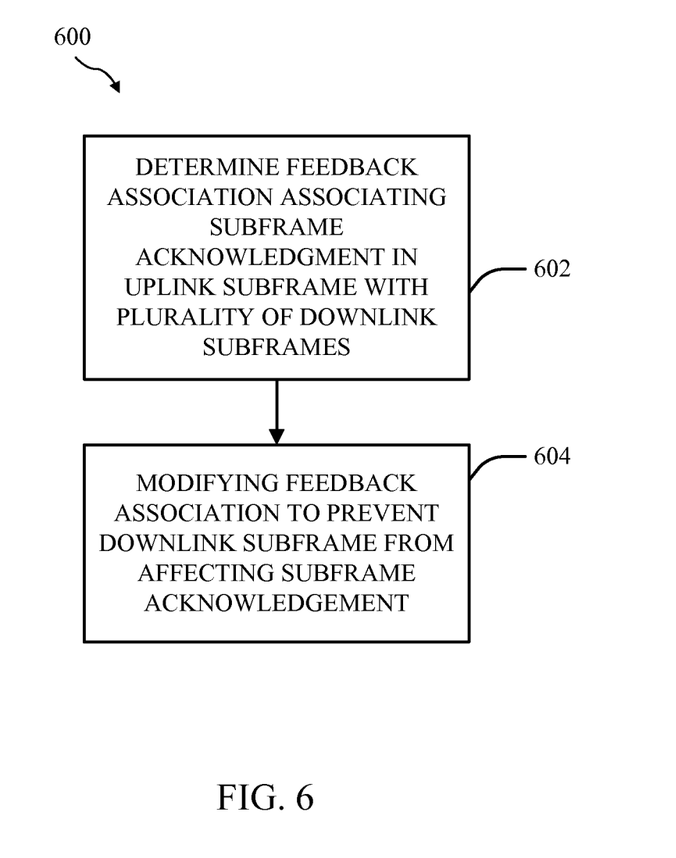
FIG. 6 illustrates a block diagram of a subframe association according to one aspect of the present disclosure.

FIG. 6 illustrates a system 600 for associating subframes according to one aspect of the present disclosure. The system determines a feedback association associating a a subframe acknowledgement in an uplink subframe with a plurality of downlink subframes, as shown in block 602. The system then modifies the feedback association to prevent at least one downlink subframe of the plurality of downlink subframes from affecting the subframe acknowledgement, as shown in block 604.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for defining a downlink and uplink subframe association
   in a wireless communication system, the method comprising:
      determining a feedback association associating a subframe acknowledgement in an uplink subframe with a plurality of downlink subframes;
      determining at least one downlink subframe of the plurality of downlink subframes, which does not require subframe acknowledgement, the at least one determined downlink subframe being a downlink subframe not containing a Physical Downlink Control Channel (PDCCH) indicating Semi-Persistent Scheduling (SPS) release; and
      modifying the feedback association by discounting the at least one determined downlink subframe of the plurality downlink subframes from processing, to thereby prevent the at least one discounted downlink subframe from affecting the subframe acknowledgement, the acknowledgement being based on at least one undiscounted subframe of the plurality of subframes.

2. The method of claim 1, in which the subframe acknowledgement comprises a binary acknowledgement indicating whether the plurality of downlink subframes were received successfully.

3. The method of claim 1 further comprising:
receiving the downlink subframes;
generating the subframe acknowledgement based on the modified feedback association; and
transmitting an acknowledgement in the uplink subframe based on the modified feedback association.

4. The method of claim 1 in which the modified feedback association prevents at least one subframe type from affecting the subframe acknowledgement.

5. The method of claim 1 in which the at least one discounted downlink subframe comprises one of:
a blank subframe;
an almost blank subframe transmitting only a cell specific Reference Signal (RS);
a subframe configured in a Time Division Multiplex (TDM) partition to not transmit one of a Physical Downlink Shared Channel (PDSCH) and a Physical Downlink Control Channel (PDCCH) indicating Semi-Persistent Scheduling (SPS) release;
a subframe in a Downlink Pilot Timeslot (DwPTS) having a subframe configuration in which the PDSCH is not transmitted and a user equipment (UE) is not in an SPS active mode in the DwPTS subframe; and
a Multi-Media Broadcast over a Single Frequency Network (MBSFN) subframe and the UE is not in an SPS active mode in the MBSFN subframe.

6. The method of claim 1 in which the plurality of downlink subframes are from different carriers.

7. The method of claim 1 in which a user equipment receives a signal indicating the at least one discounted downlink subframe without corresponding feedback.

8. A computer program product for wireless communications in a wireless network, comprising:
a non-transitory computer-readable medium having program code recorded thereon, the program code comprising:
program code to determine a feedback association associating a subframe acknowledgement in an uplink subframe with a plurality of downlink subframes;
program code to determine at least one downlink subframe of the plurality of downlink subframes, which does not require subframe acknowledgement, the at least one determined downlink subframe being a downlink subframe not containing a Physical Downlink Control Channel (PDCCH) indicating Semi-Persistent Scheduling (SPS) release; and
program code to modify the feedback association by discounting the at least one determined downlink subframe of the plurality downlink subframes from processing, to thereby prevent the at least one discounted downlink subframe from affecting the subframe acknowledgement.

9. The computer program product of claim 8, in which the subframe acknowledgement is a binary acknowledgement indicating whether the plurality of downlink subframes were received successfully.

10. The computer program product of claim 8 further comprising:

program code to receive downlink subframes;
program code to generate the subframe acknowledgement based on the modified feedback association; and
program code to transmit an acknowledgement in the uplink subframe based on the modified feedback association.

11. The computer program product of claim 8 in which the at least one discounted downlink subframe comprises one of:
a blank subframe;
an almost blank subframe transmitting only a cell specific Reference Signal (RS);
a subframe configured in a Time Division Multiplex (TDM) partition to not transmit one of a Physical Downlink Shared Channel (PDSCH) and a Physical Downlink Control Channel (PDCCH) indicating Semi-Persistent Scheduling (SPS) release;
a subframe in a Downlink Pilot Timeslot (DwPTS) having a subframe configuration in which the PDSCH is not transmitted and a user equipment (UE) is not in an SPS active mode in the DwPTS subframe; and
a Multi-Media Broadcast over a Single Frequency Network (MBSFN) subframe and the UE is not in an SPS active mode in the MBSFN subframe.

12. The computer program product of claim 8 in which the plurality of downlink subframes are from different carriers.

13. The computer program product of claim 8 in which a user equipment receives a signal indicating the at least one discounted downlink subframe without corresponding feedback.

14. An apparatus operable in a wireless communication system, the apparatus comprising:
at least one processor; and
a memory coupled to the at least one processor, the at least one processor being configured:
to determine a feedback association associating a subframe acknowledgement in an uplink subframe with a plurality of downlink subframes;
to determine at least one downlink subframe of the plurality of downlink subframes, which does not require subframe acknowledgement, the at least one determined downlink subframe being a downlink subframe not containing a Physical Downlink Control Channel (PDCCH) indicating Semi-Persistent Scheduling (SPS) release; and
to modify the feedback association by discounting the at least one determined downlink subframe of the plurality downlink subframes from processing, to thereby prevent the at least one discounted downlink subframe from affecting the subframe acknowledgement.

15. The apparatus of claim 14, in which the subframe acknowledgement is a binary acknowledgement indicating whether the plurality of downlink subframes were received successfully.

16. The apparatus of claim 14, in which the at least one processor is further configured:
to receive downlink subframes;
to generate the subframe acknowledgement based on the modified feedback association; and
to transmit an acknowledgement in the uplink subframe based on the modified feedback association.

17. The apparatus of claim 14 in which the modified feedback association prevents at least one subframe type from affecting the subframe acknowledgement.

18. The apparatus of claim 14 in which the at least one discounted
downlink subframe comprises one of: a blank subframe; an almost blank subframe transmitting only a cell specific Reference Signal (RS); a subframe configured in a Time Division Multiplex (TDM) partition to not transmit one of a Physical Downlink Shared Channel (PDSCH) and a Physical Downlink Control Channel (PDCCH) indicating Semi-Persistent Scheduling (SPS) release;

a subframe in a Downlink Pilot Timeslot (DwPTS) having a subframe configuration in which the PDSCH is not transmitted and a user equipment (UE) is not in an SPS active mode in the DwPTS subframe; and a Multi-Media Broadcast over a Single Frequency Network (MBSFN) subframe and the UE is not in an SPS active mode in the MBSFN subframe.

19. The apparatus of claim 14 in which the plurality of downlink subframes are from different carriers.

20. The apparatus of claim 14 in which a user equipment receives a signal indicating the at least one discounted downlink subframe without corresponding feedback.

* * * * *